United States Patent
Kannan et al.

(10) Patent No.: US 12,412,087 B2
(45) Date of Patent: Sep. 9, 2025

(54) CLASSIFYING DATA FROM DE-IDENTIFIED CONTENT

(71) Applicant: International Business Machines Corporation, Armonk, NY (US)

(72) Inventors: Aswin Kannan, Chennai (IN); Balaji Ganesan, Bengaluru (IN); Shanmukha Chaitanya Guttula, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 1109 days.

(21) Appl. No.: 17/238,567

(22) Filed: Apr. 23, 2021

(65) Prior Publication Data
US 2022/0343151 A1    Oct. 27, 2022

(51) Int. Cl.
*G06N 3/08* (2023.01)
*G06F 16/93* (2019.01)
*G06N 3/04* (2023.01)

(52) U.S. Cl.
CPC .............. *G06N 3/08* (2013.01); *G06F 16/93* (2019.01); *G06N 3/04* (2013.01)

(58) Field of Classification Search
CPC . G06N 3/04; G06N 3/08; G06N 20/00; G06F 16/93
See application file for complete search history.

(56) References Cited

U.S. PATENT DOCUMENTS

| | | | |
|---|---|---|---|
| 7,630,981 B2 | 12/2009 | Xu et al. | |
| 7,853,555 B2 | 12/2010 | Peoples et al. | |
| 8,024,339 B2 | 9/2011 | Barker et al. | |
| 8,635,107 B2 | 1/2014 | Chang et al. | |
| 9,558,179 B1 | 1/2017 | Jurca et al. | |
| 9,754,128 B2 | 9/2017 | Golic | |
| 10,223,586 B1* | 3/2019 | Leibovitz | G06V 30/416 |
| 10,878,124 B1* | 12/2020 | Sitaraman | G06N 5/047 |
| 2008/0027895 A1* | 1/2008 | Combaz | G06F 16/335 |
| 2010/0076957 A1* | 3/2010 | Staddon | G06F 16/313 |
| | | | 707/722 |

(Continued)

OTHER PUBLICATIONS

Espinosa-Anke, L., et al.,, Finding and Expanding Hypernymic Relations In The Music Domain, in 19th International Conference of the Catalan Association for Artificial Intelligence (CCIA), Barcelona, Spain, Oct. 19, 2016, 6 pgs.

(Continued)

*Primary Examiner* — Tamara T Kyle
*Assistant Examiner* — William Wong
(74) *Attorney, Agent, or Firm* — Ryan, Mason & Lewis, LLP (57) ABSTRACT

Methods, systems, and computer program products for classifying data from de-identified content are provided herein. A computer-implemented method includes applying one or more rules to identify one or more structural elements of a document; determining, based at least in part on the one or more structural elements, one or more pairs of words within the document having a hypernym relationship; extracting de-identified content within the document based on one or more de-identification techniques applied to the document; and applying a set of causal rules to the de-identified content and the one or more pairs of words to annotate at a least a portion of the de-identified content as belonging to a class of protected content.

20 Claims, 7 Drawing Sheets

(56) References Cited

U.S. PATENT DOCUMENTS

| | | | |
|---|---|---|---|
| 2013/0166303 A1* | 6/2013 | Chang | G06F 16/7834 |
| | | | 707/723 |
| 2014/0059011 A1 | 2/2014 | Bostick et al. | |
| 2015/0235143 A1* | 8/2015 | Eder | G16Z 99/00 |
| | | | 706/12 |
| 2017/0300565 A1* | 10/2017 | Calapodescu | G06F 16/353 |
| 2020/0152302 A1* | 5/2020 | Co | G16H 70/20 |
| 2020/0334381 A1* | 10/2020 | Yarowsky | G06F 40/166 |
| 2021/0256160 A1* | 8/2021 | Hachey | G06N 20/00 |
| 2022/0188567 A1 | 6/2022 | Ganesan et al. | |

OTHER PUBLICATIONS

Snow, R., et al., Learning Syntactic Patterns for Automatic Hypernym Discovery, in Advances in Neural Information Processing Systems 17, L. K. Saul, Y. Weiss, and L. Bottou, eds., MIT Press, 2005, pp. 1297-1304.

Wang, Chenguang, et al., Towards Re-Defining Relation Under-Standing in Financial Domain. Proceedings of the 3rd International Workshop on Data Science for Macro-Modeling with Financial and Economic Datasets. 8, ACM. (2017), 6 pgs.

V. Baisa and V. Suchomel, Corpus Based Extraction of Hypernyms in Terminological Thesaurus for Land Surveying Domain, in Ninth Workshop on Recent Advances in Slavonic Natural Language Processing, Brno, 2015, Tribun EU, pp. 69-74.

Wintergerst, Luca et al., Protecting GDPR Personal Data with Pseudonymization, published in elastic.co, available at https://www.elastic.co/blog/gdpr-personal-data-pseudonymization-part-1, Mar. 27, 2018, 14 pgs.

Eder, Elisabeth, et al., De-Identification of Emails: Pseudonymizing Privacy-Sensitive Data in a German Email Corpus, Proceedings of the International Conference on Recent Advances in Natural Language Processing (RANLP 2019), 2019, 11 pgs.

Alfalahi, A., Brissman, S., & Dalianis, H. (2012). Pseudonymisation Of Personal Names and Other PHIs in an Annotated Clinical Swedish Corpus. In Third Workshop on Building and Evaluating Resources for Biomedical Text Mining (BioTxtM 2012) Held in Conjunction with LREC (pp. 49-54).

Apache UIMA Ruta (Rule-based Text Annotation), published in Unstructured Information Management Architecture, available at https://uima.apache.org/ruta.html, last accessed Apr. 11, 2021, 3 pgs.

Five Ways Imperva Helps You with GDPR Compliance, Imperva, available at https://www.imperva.com/resources/datasheets/Imperva-Five-Ways-Imperva-HelpsWith-GDPR-2020.pdf, last accessed Apr. 11, 2021, 6 pgs.

Whitelegg, Dave, Minimizing application privacy risk, IBM, https://developer.ibm.com/solutions/security/articles/s-gdpr3/, published May 25, 2018, 19 pgs.

Mouna Kamel, et al., Extracting hypernym relations from Wikipedia disambiguation pages: comparing symbolic and machine learning approaches, International Conference on Computational Semantics (IWCS 2017), Montpellier, France, Sep. 2017, 14 pgs.

Mell, Peter, et al., The NIST Definition of Cloud Computing, National Institute of Standards and Technology, U.S. Department of Commerce, NIST Special Publication 800-145, Sep. 2011, 7 pgs.

Kannan et al., "Document Structure Measure for Hypernym discovery", arXiv:1811.12728, Nov. 30, 2018, 07 pages, https://doi.org/10.48550/arXiv.1811.12728.

Klimt et al., "The Enron Corpus: A New Dataset for Email Classification Research", ECML 2004, Lecture Notes in Computer Science, vol. 3201, Sep. 2004, pp. 217-226, DOI:10.1007/978-3-540-30115-8_22.

Vannur et al., "Data Augmentation for Personal Knowledge Base Population", arXiv:2002.10943, Aug. 18, 2020, 08 pages, https://doi.org/10.48550/arXiv.2002.10943.

* cited by examiner

CLASSIFYING DATA FROM DE-IDENTIFIED CONTENT

BACKGROUND

The present application generally relates to information technology and, more particularly, to classifying personal data from de-identified content.

Organizations are increasingly focused on managing personal data in order to comply with requirements set forth in new and evolving regulatory documents (such as, for example, laws, regulations, and/or internal policies).

SUMMARY

In one embodiment of the present disclosure, techniques for classifying personal data from de-identified content are provided. An exemplary computer-implemented method includes the steps of applying one or more rules to identify one or more structural elements of a document; determining, based at least in part on the one or more structural elements, one or more pairs of words within the document having a hypernym relationship; extracting de-identified content within the document based on one or more de-identification techniques applied to the document; and applying a set of causal rules to the de-identified content and the one or more pairs of words to annotate at a least a portion of the de-identified content as belonging to a class of protected content.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

An example of a regulatory document relating to managing personal data is the General Data Protection Regulation (GDPR). The definition of personal data includes basic details (such as name and address information) as well as online identifiers, location data, individual preferences, hobbies, and biometric/genetic data. The GDPR requires, for example, personal data to be de-identified prior to it being used by foreign or third-party organizations. Non-limiting examples of de-identification techniques include anonymization and pseudonymization.

As described herein, an exemplary embodiment includes applying one or more predefined rules based on the structure of a document to associate portions of text in the document to a hypernymy (which may include hypernyms and hyponyms, for example). An event A refers to an instance when text is associated to a hypernymy. Also, regulated data (for example, personal data or sensitive data) is extracted from samples of annotated training data. The annotated training data is used to learn which content is regulated data. An event B refers to an instance when regulated data is extracted. Also, such an embodiment includes finding portions of text in the document that correspond to regulated data. An event C refers to an instance when such regulated data is found in the document.

Further, such an embodiment may include computing a mutual dependance (and/or independence) between events A, B, and C using predefined thresholds (such as, for example, a T distribution or Chi-Square Distribution). The computing may be performed across all words in a list of interest. The list of interest generally refers to a list of words that are used for defining events and is user and problem specific. In some examples the list of interest may include specific classes of words in the document, and in other examples the list may include all the words in the document. By way of example, in the sentence "Mr. X was a tall person", the words "was" and "a" may be omitted for being classified as events, so the list of interest includes the following four words: "Mr.", "X", "tall", and "person".

Additionally, causality rules (such as, for example, CCU causality rules) are applied to identify words that satisfy the following rule: words characterized by the event set B correspond to sensitive/personal data, as explained in more detail herein.

In some example embodiments, the annotated training data is coarsely labeled. By way of example, consider the following text sample: "Mr. X has been identified by the number G11*456". This has been exhaustively found in all his records." In such an example, the word "G11*456" may be coarsely labeled as "Personal Identifiable Information," without needing to have finer grained labels (such as, for example, the word "G11*456" being labeled as a "Credit Card Number").

It is to be appreciated that such an embodiment is not limited to a causality rule model, and the techniques described herein may be generalized to other rule-based systems, such as, for example, learning classifier systems, association rule learning systems, and artificial immune systems. By way of example, the techniques described herein may be extended to one or more of:

Frequency mining based on contexts in which pseudonymized text and hypernyms appear "together" "by-self" can help construct association rules.

Training for personal data in conjunction with IF-THEN user-defined rules to develop strong LCS classifiers (manual inputs are required).

The above may be automated, at least in part, by modeling the co-occurrence of pseudonymized text and hypernyms in the form of Markovian states.

Applying frequency mining to hypernym discovery alone to discover co-occurrence levels, which can be further smoothened by using SVM kernels or Markovian models to obtain probabilistic estimates, for example.

Portions of the hypernym discovery problem may be modeled based on genetic algorithms and artificial immune systems based on user expertise.

Figure 1:
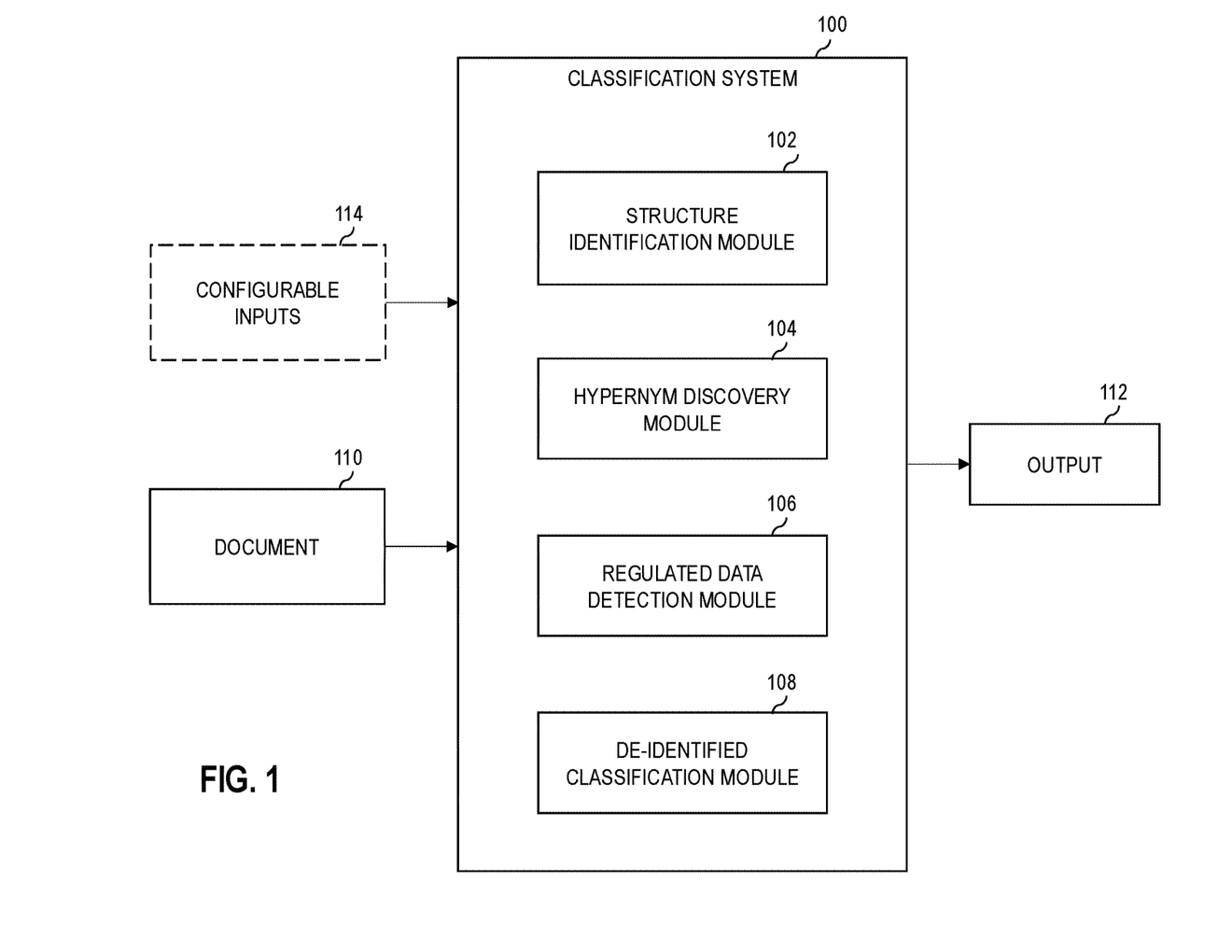
FIG. 1 is a diagram illustrating a system architecture in accordance with exemplary embodiments.

FIG. 1 is a diagram illustrating a system architecture in accordance with an exemplary embodiment. By way of illustration, FIG. 1 depicts classification system 100, which includes a structure identification module 102, a hypernym discovery module 104, a regulated data detection module 106, and a classification module 108. In the FIG. 1 embodiment, structure identification module 102 identifies structural elements of a document 110 based on one or more rules (for example, rules for identifying paragraph indents, bullets, etc.). The hypernym discovery module 104 computes a set of hypernym relationships (pairs) based on the structural elements using, for example, dependence/independence thresholds.

The regulated data detection module 106 determines instances of regulated data in the document 110. For example, the regulated data detection module 106 may obtain a training data sample (such as one of the configurable inputs 114, for example) is annotated as "anonymized," and be trained to extract a portion of text having a consecutive string of x's being used as part of an anonymization technique.

The classification module 108 classifies portions of the document 110 as belonging to a class of regulated data based on, for example, the set of hypernym relationships and the extracted portions of text determined by the regulated data detection module 106. The classification system 100 generates output 112 comprising information pertaining to the regulated data in the document 110 (for example, annotated content and/or location of such content within the document 110).

In at least one example embodiment, the classification system 100 also obtains one or more configurable inputs 114. The configurable inputs 114 may include pseudonym and/or anonymization identifiers in the form of, for example, embedding and/or context vectors corresponding to training data from other labeled data samples. The training data may be used by the regulated data detection module 106 as noted above, for example. In some example embodiments, the configurable inputs 114 may include tunable parameters corresponding to at least one of: independence thresholds for causality rules and expectation thresholds to be used when classifying content of the document 110 as including regulated content, as explained in more detail elsewhere herein.

One or more example embodiments perform hypernym discovery techniques to discover content (for example, words or text) that have an "is-a" relationship with a given term. Such hypernym discovery techniques implement a new context type and a relatedness measure to differentiate hypernyms from other types of semantic relationships. Further, a document structure measure is determined based on the presence of terms in a particular structural hierarchy of a document. For example, consider a structural hierarchy of a document includes a title section. If a first word is found in the title and a second word is not found in the title, then an indicator value with respect to the title section for the first word may be assigned a value of 1, and an indicator value with respect to the title for the second word may be assigned a value of 0. The document structure measure, in some examples, quantifies the document structure based on multiple attributes and classes of weighted distance functions. Further, in at least one embodiment, indicator-based context vectors are formulated to quantify structural measures and functions are developed to relate word-pairs and classify personal data based on such context vectors.

By way of example, consider a document having section titles. Typically, hypernyms are found in section titles with a higher probability than hyponyms (for example, the word "Country" or "Geographical Location" are generally more common qualifiers for a section title than "North America"). As another example, if the text "South-East Asia" is included as part of a section title, then it is more likely for the document title to include the word "Country". Such situations may be expressed mathematically. For instance, a word appearing in a section title proportionately increases the probability of it being a hypernym, and the inverse relationship is defined by an appropriate fraction. Let $z_c^2(x)$ denote the context that is specific to section titles for a word, x. Then, the distribution function may be expressed as:

$$CDE_C^2 = w_3 z_C^2(y) + \frac{w_4}{z_c^2(x)} \quad (1)$$

As another example, text relating to a description of a term are more likely to include, or correspond to, hypernyms. For example, the term "color" may be described using the names of colors (for example, blue, green, etc.) and/or may be used to repetitively in the text to establish certain relationships or define key points in a discussion. Accordingly, in some example embodiments, functions are specified to account for these and other situations.

It is instructive to note that some words may be hypernyms in general, without being specifically associated to a word. As an example, "personal information" may point to names, addresses, biographical details, etc., and cover a broad range of labels. Although such words are technically not hypernyms without the presence of the required subsets, one or more embodiments apportion a value of probability independently to such generalized terms. According to one embodiment, a set of vectors, $v_a(x)$, $v_b(x)$, and $v_c(x)$ are discovered to define the contexts in which a word, x, is considered a relational hypernym, a relational hyponym, and a general hypernym, respectively. It is noted that $v_a$ and $v_b$ have the same contexts within the document, but in different (for example, opposite) senses. By way of example, if $v_a$ takes the vector for relational hypernyms, $v_b$ takes the same for relational hyponyms. Then, $v_b$ takes an expression which is similar to $-v_a$ (negative of $v_a$), which in some embodiments may be scaled by an application-specific factor. As another example, 0-1 terminology may be applied such that if $v_a=0$, then $v_b=1$. For clarity, this example is in one-dimension, but it is to be appreciated that such techniques are also applicable to higher dimensions. Such contexts are discovered based on the structural elements of a document.

By way of example, consider a document having the following bulleted text: "X contains the following:

X1

X2"

The document may be split into multiple paragraphs, wherein each paragraph includes at most only one set of bulleted text. Bulleted text (as well as lists/enumerations, for example) is more probable to be hyponyms. In the example above, X1 and X2 may be considered hyponyms of X. More generally, given two words x and y, their probability of hypernym-hyponym relationship specific to a given context, i (which in the example above is a bulleted list), can be stated as follows:

$$p_i(x, y) = \frac{\sum_{j=1}^{m_i} v_a^{i,j}(x) \cap v_b^{i,j}(y)}{\sum_{j=1}^{m_i} v_a^{i,j}(x)} \quad (2)$$

Equation (2) can be generalized to all possible contexts as follows:

$$\rho(x, y) = \sum_{i=1}^{m} w_i f_i(n_x, n_{i,x}) p_i(x, y) \quad (3)$$

In equation (3), $n_{i,x}$ refers to a number of times the word x occurs in text preceding the bullets in the document, $n_x$ denotes the overall number of times the word x has appeared in the document, $w_i$ refers to the importance weights corresponding to the context, and $f_i$ refers to measurement functionals corresponding to the context. For example, the values of w corresponding to bulleted text may be set higher than the values of w for highlighted text to indicate more importance should be placed on bulleted text.

Other contexts that may be considered include, for example:

Hyperlinks/URL content: It is more likely that hyperlinks and URLs include hypernyms in the first portion of the content and hyponyms in the second portion of the content (for example, www.webmd.com/..../symptoms/headache, wherein symptoms goes into the $v_a$ bin and headache into $v_b$).

Footnotes: Content corresponding to footnotes are more likely to include hyponym (for example, consider "Word¹", where "Word" is the hypernym and the content of the footnote corresponding to "1" may include hyponyms.

Section headers, paragraphs headers, and subsections: This type of content generally follows a hierarchical order (for example, when a word x occurs in the section title and word y occurs in the paragraph, x is more likely to be a hypernym of y.

Words within brackets: Content within brackets is more likely to be hyponyms (for example, "Eastern Geographical Location (for example, Japan, Singapore, and Thailand")).

Subscripts and superscripts: Content corresponding to subscripts and superscripts is more likely to be hyponyms (for example, "1ˢᵗ, 2ⁿᵈ and 3ʳᵈ Class", wherein "Class" is the hypernym).

Words succeeding indents: Similar to section titles, content succeeding indents are more likely to be hypernyms as the first few words after an indent can summarize the content that follows (for example, consider the following content: "A few priorities are required. For example, evening exercises, Yoga, and jogging help maintain fitness.").

Words defining under-braces and over-braces: Such content is more likely to include hypernyms, such as those used in mathematical descriptors, for example.

According to at least one example embodiment, the general context vector, $v_c$, is expressed slightly differently than the context vectors, $v_a$ and $v_c$. More specifically, word-pairs are specific to occurrences of a hyponym within a window of the word x. In such a case, $v_c$, covers and accounts for both the hypernym and hyponym. As such, when the context of a word indicates a hypernym, the corresponding value of $v_c$ is set to 1. In cases of hyponyms, the value is set to −1 and 0 otherwise. As such, the probability measure may take the following form:

$$p_i(x, y) = \sum_j v_c^{i,j}(x) \left( \frac{1 - \min(v_c^{i,j}(y), 0)}{1 + \max(v_c^{i,j}(y), 0)} \right) \quad (4)$$

Structural elements of a document that factor into determining the general context vector may include, for example:

Captions of figures, lists, and tables: Such captions are more likely to include hypernyms.

Content with hyphens, colon, semicolon, commas, quotations: Such content is more likely to include hyponym/hypernyms.

Word preceding a question mark: If the word is a noun, then it is more likely to be a hyponym.

Words before and after dates/schedules/raw numbers: Such content can indicate hypernym/hyponym pairs.

Words within markings/watermark/highlighting: Such content is more likely to be hyponyms/confidential information.

Single-worded cells in excel like data: Such content is more likely to include hypernyms.

Figures/Shapes: The beginning of a figure (for example, the first for shapes/boxes in process flow diagrams created using diagramming software) are more likely to correspond to hypernyms.

Word-case: Content in upper-case is more likely to be hypernyms.

Color/bold/italics/underline: Similar to highlighted content, this type of content is more likely to be hypernyms.

Words following symbols: Content following symbols (for example, >, <, ||, &&, and #) is more likely to be hyponyms.

Words corresponding to information boxes/remarks: Such content is more likely to be hypernyms.

Font-size: Larger font-size (for example, relative to other fonts in the document) is more likely to include hypernyms.

Number of words in a spreadsheet cell: A greater number of words in a cell indicates the content is more likely to be hyponyms.

Words in introduction/conclusion: Content is more likely to be hypernyms.

References: Content referring to references is more likely to contain hyponyms.

Appendix content: Content is more likely to contain more hypernyms.

Text Spacing: Content is more likely to include hypernyms (for example, spacing for quotations).

Keywords/abstract/general terms: Content is more likely to include hypernyms (for example, journal articles).

As such, one or more embodiments include identifying such structural elements in a structured element (for example, using structure identification module 102) and discovering the context vectors, $v_a$, $v_b$, and $v_c$ (for example, using hypernym discovery module 104).

Some example embodiments include a process for detecting de-identified data (for example, using regulated data detection module 106), which includes classifying and labeling content based on whether or not the content is de-identified content. For example, one embodiment implements a deep neural network (DNN) that classifies content as being either pseudonymized content or not. Alternatively, or additionally, another DNN may be implemented to determine whether content is anonymized or not. For example, a DNN may consider multiple features that depend on mentions of entities in a document, context representations, and word embeddings. It is to be appreciated that these are merely examples of DNNs and it is to be appreciated that different architectures may be used, such as a single DNN that classifies both pseudonymization and anonymization, for example.

Figure 2:
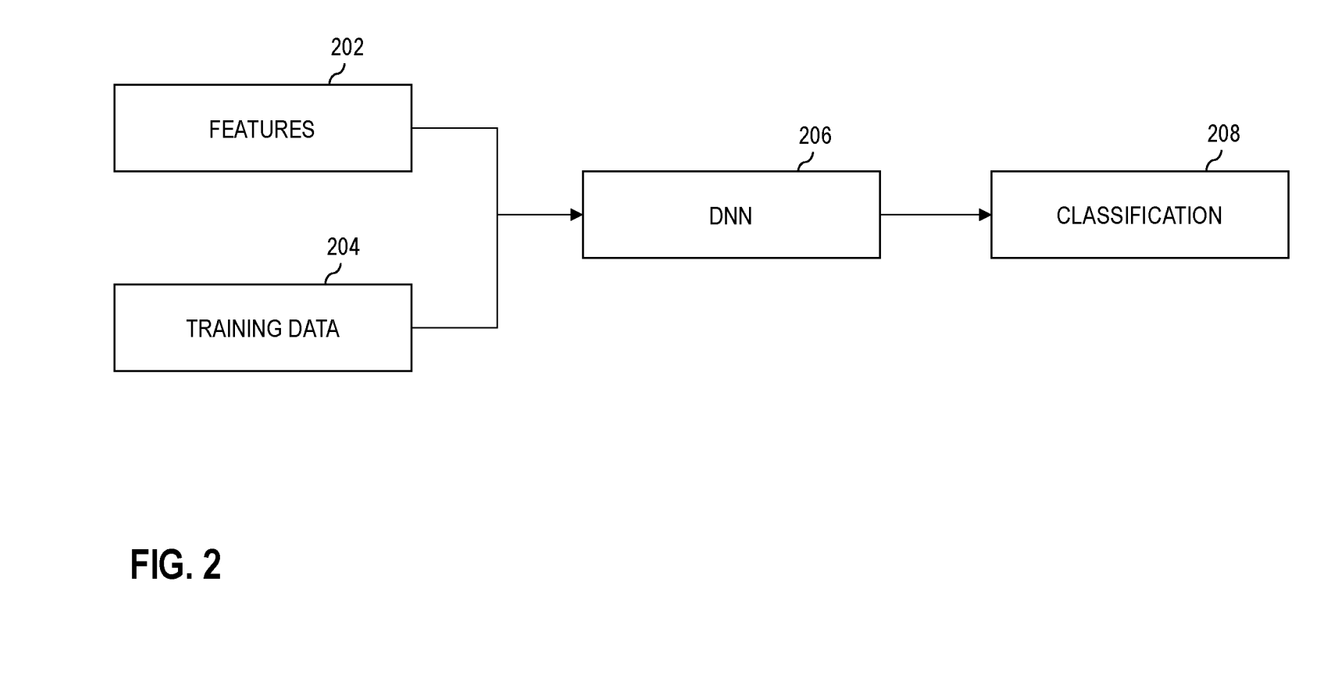
FIG. 2 is a diagram illustrating a de-identified discovery process in accordance with exemplary embodiments.

FIG. 2 is a diagram illustrating a de-identified content discovery process in accordance with exemplary embodiments. The FIG. 2 embodiment includes training a DNN 206 using a set of training data 204 and a set of features 202. The DNN 206 is trained to output a classification 208 indicating whether a given sample of content is de-identified or not. By way of example, the set of features 202 may include word embeddings that account for the context and entity mentions of the word, and document structure measures, such as, for example, generalized context vectors. In at least some example embodiments, the DNN 206 implements nonlinear terms in the activation functions (namely, in the sigmoid) to account for pseudonymized tags that are the same for different content. Additionally, the DNN 206 may comprise a hidden layer and a completely connected layer to account for all possible features in the set of features 202. In at least one embodiment, weighted losses may be used to account for false positives and false negatives, as needed.

As noted elsewhere herein, example embodiment may include determining a first event (event A) by applying one or more predefined rules to associate portions of text of a structured document to a hypernymy and determining a second event (event B) by detecting de-identified data identified in training data. The following table may be used to represent occurrences of A and B, wherein $q_{11}$ represents the co-occurrence of A and B:

|   | B | $\bar{B}$ |
|---|---|---|
| A | $q_{11}$ | $q_{10}$ |
| $\bar{A}$ | $q_{01}$ | $q_{00}$ |

In at least one example embodiment, a chi-squared test for dependence is applied to determining causality between events A and B. Generally, the chi-squared test determines how closely an observed observation is to an independent distribution, and is defined as:

$$\chi^2_{A,B} = \sum_{ij} \frac{(O(q_{ij}) - E(q_{ij}))^2}{E(q_{ij})} \quad (5)$$

In equation (5), O ($q_{ij}$) is the observed value of two nominal variables, and E($q_{ij}$) is the expected value of two nominal variables. For example, the expected value, E($q_{11}$), corresponds to the expected number of transactions between the A and B.

Figure 3:
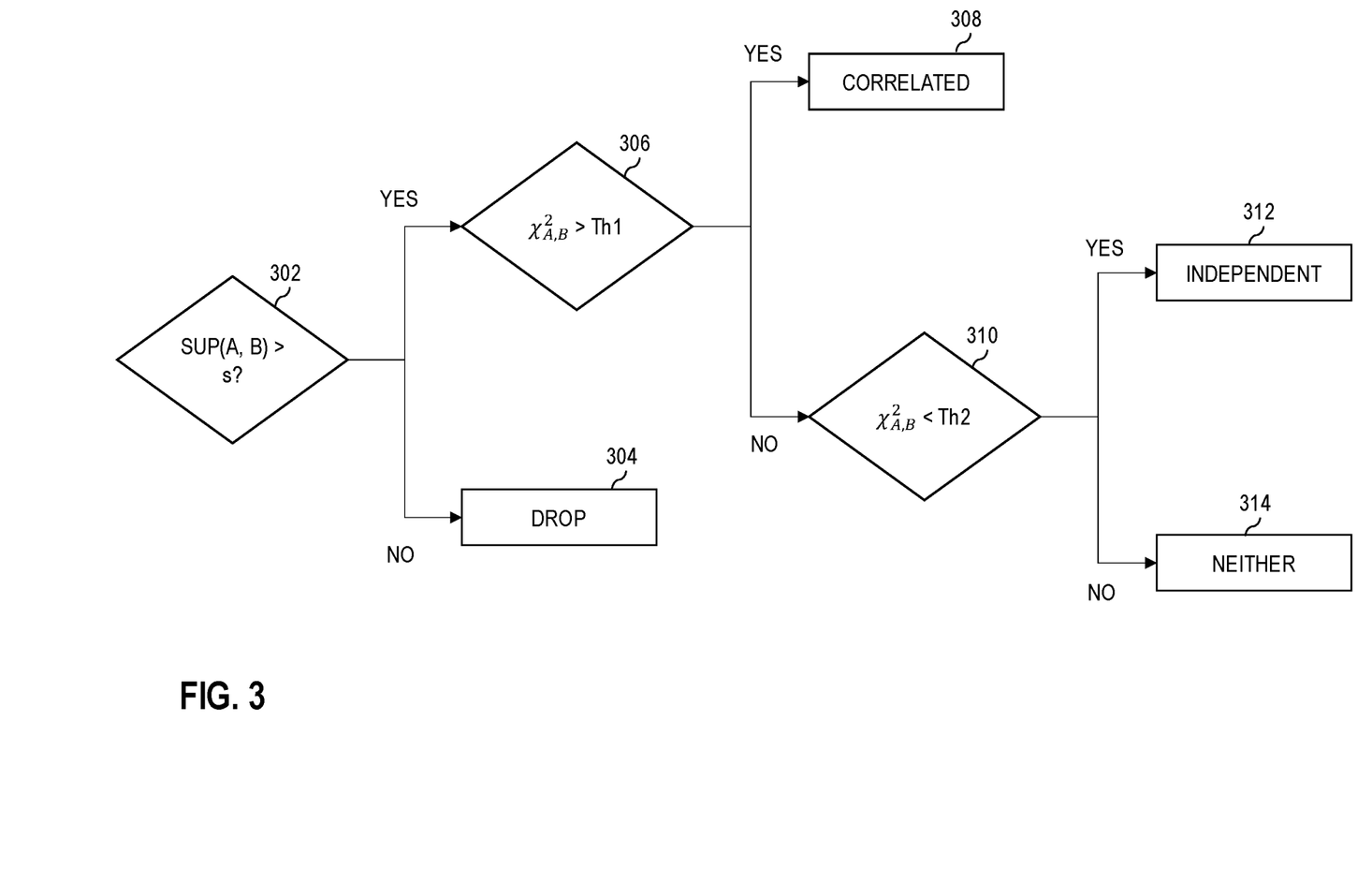
FIG. 3 is a diagram illustrating a causality process in accordance with exemplary embodiments.

Referring also to FIG. 3, this figure shows an example process for determining whether or not two events are correlated using a chi-squared test. Step 302 includes comparing the support of A and B (denoted Sup(A, B)) to a threshold, s, wherein s is a tunable parameter. Generally, as the value of the support increases, the number of correlated pairs, uncorrelated pairs, and rules decreases, which results in relationships that are less supported (for example, less interesting) being filtered out.

If Sup(A, B) is less than s, then step 304 includes dropping (or ignoring) the pair of events. Otherwise, the process continues to step 306, which includes comparing the $\chi^2_{A,B}$ to an independence threshold, Th1. It is noted that Th1 is a tunable parameter, and as Th1 increases the number of uncorrelated pairs also increases. If $\chi^2_{A,B}$ is greater than Th1, then step 308 includes determining that A and B are correlated, otherwise the process continues to step 310.

Step 310 includes determining whether $\chi^2_{A,B}$ is less than a dependence threshold, Th2. Th2 is also tunable parameter, wherein the number of correlated pairs is decreased as Th2 increases. If $\chi^2_{A,B}$ is less than Th2, then step 312 includes determining that A and B are independent, otherwise, the process continues to step 314. Step 314 includes determining that A and B are neither correlated nor independent.

An example embodiment includes applying causality rules (for example, by the classification module 108) to determine whether content in a structured document corresponds to sensitive and/or personal data. An example of a causality rule includes the following CCU causality rule:
If events B and A and B and C are dependent or correlated, and if events A and C are independent or uncorrelated, and if events A and C become dependent when conditioned on B;
Then, the following causal relationship exists between A, B, and C: A→B←C.

Another example of a causality rule includes the following CCC causality rule:
If events A, B and C are pair-wise dependent or correlated, and if events A and C become independent when conditioned on B;
Then, one of the following causal relationships exists between A, B, and C: A←B→C, A→B→C, A←B←C.

Figure 4:
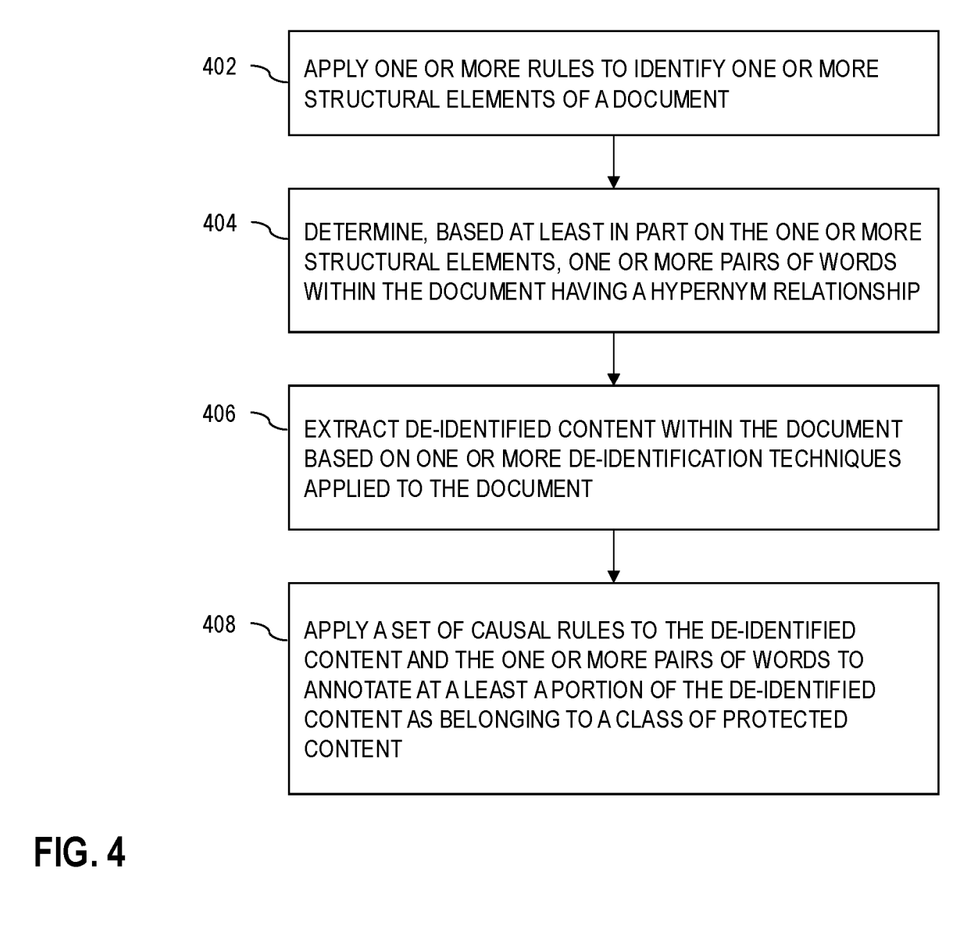
FIG. 4 is a flow diagram illustrating techniques in accordance with exemplary embodiments.

FIG. 4 is a flow diagram illustrating techniques in accordance with exemplary embodiments. Step 402 includes applying one or more rules to identify one or more structural elements of a document. Step 404 includes determining, based at least in part on the one or more structural elements, one or more pairs of words within the document having a hypernym relationship. Step 406 includes extracting de-identified content within the document based on one or more de-identification techniques applied to the document. Step 408 includes applying a set of causal rules to the de-identified content and the one or more pairs of words to annotate at a least a portion of the de-identified content as belonging to a class of protected content.

The determining of step 404 may include determining one or more contexts in which a given one of the words is used within the document. The one or more contexts may correspond to the one or more structural elements. The determining of step 404 may include computing a set of context vectors for the given word, wherein the set of context vectors comprises: a first vector indicating the contexts in which the given word is used as a relational hypernym; a second vector indicating the contexts in which the given word is used as a relational hyponym; and a third vector indicating the contexts in which the given word is used as a general hypernym. Computing the set of context vectors may include at least one of: determining a number of times the given word appears in the document; determining a number of times the given word precedes each of the one or more structural elements; and determining a number of times the given word succeeds each of the one or more structural elements. The one or more structural elements may relate to at least one of: at least one of a type and a style of font; a type of spacing; a type of indention; at least one of: a shape or a position of a shape within the document; one or more symbols; and one or more keywords. The de-identification techniques may include at least one of: one or more anonymization techniques and one or more pseudonymization techniques. The techniques depicted in FIG. 4 may further include training a deep neural network using one or more training labeled samples to identify at least a portion of the de-identification techniques. The set of causal rules may include at least one of a CCU causality rule and a CCC causality rule. Applying the set of causal rules to the de-identified content and the one or more pairs of words may include: applying one or more thresholds to compute at least one of a mutual independence and a mutual dependence between the de-identified content and the one or more pairs of words. The class of protected content may be defined by a regulatory document.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 5:
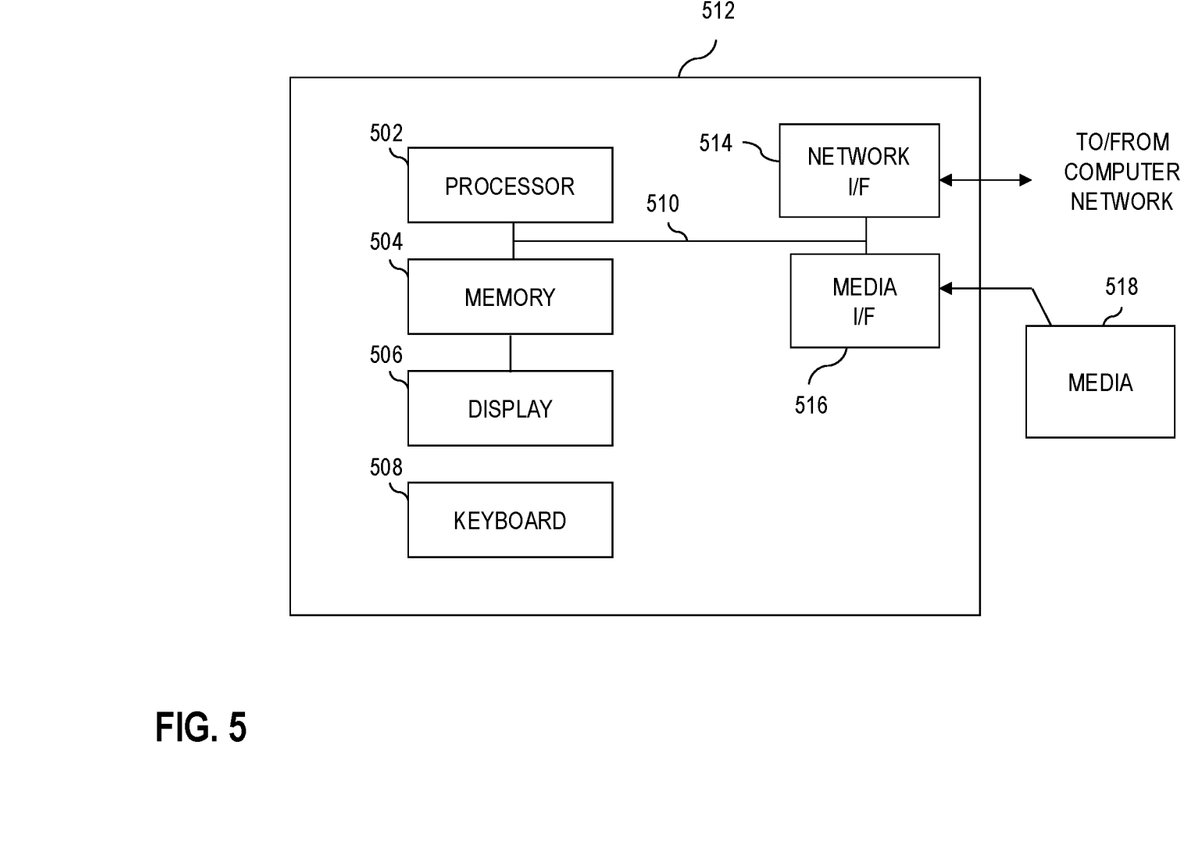
FIG. 5 is a system diagram of an exemplary computer system on which at least one embodiment of the present disclosure can be implemented.

Additionally, an embodiment of the present disclosure can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
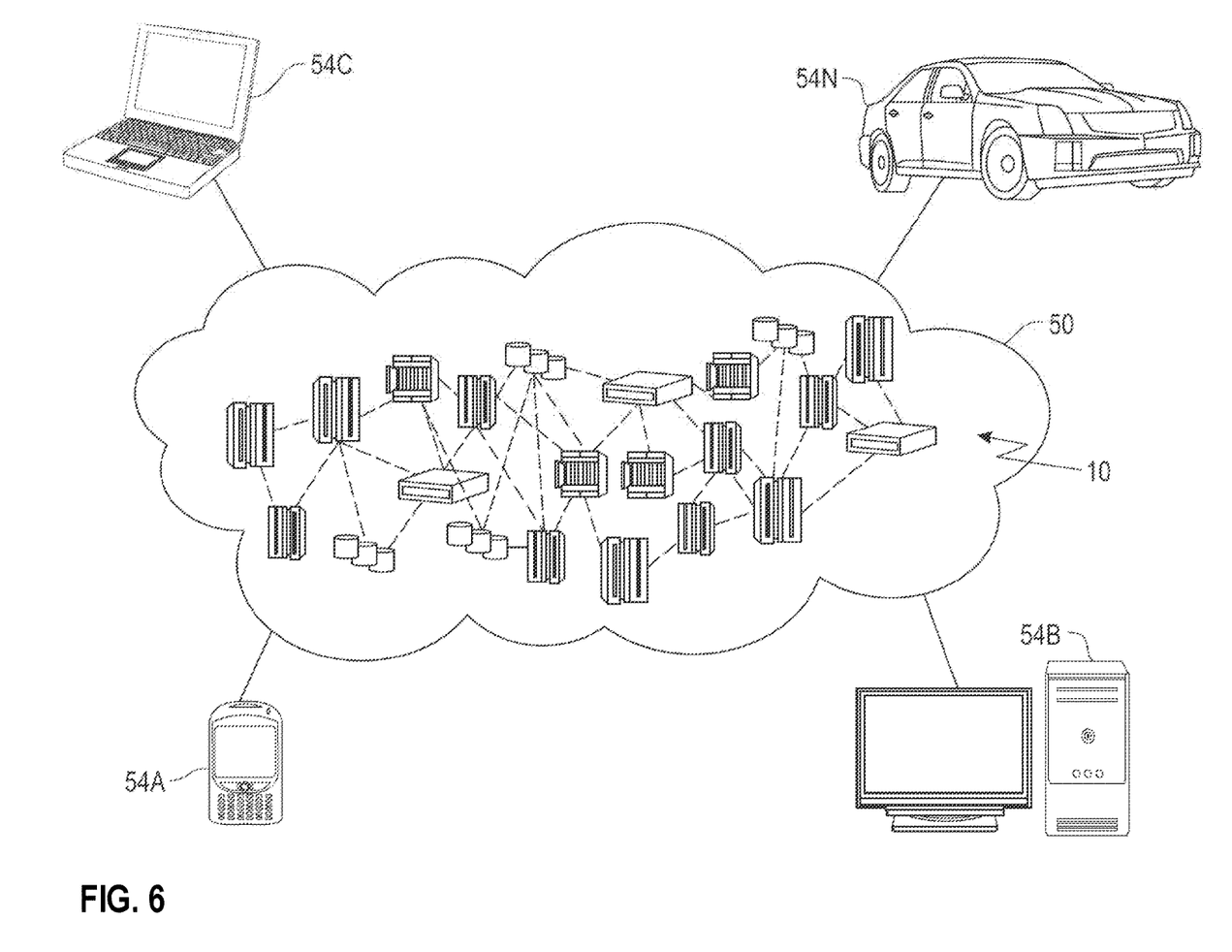
FIG. 6 depicts a cloud computing environment in accordance with exemplary embodiments.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
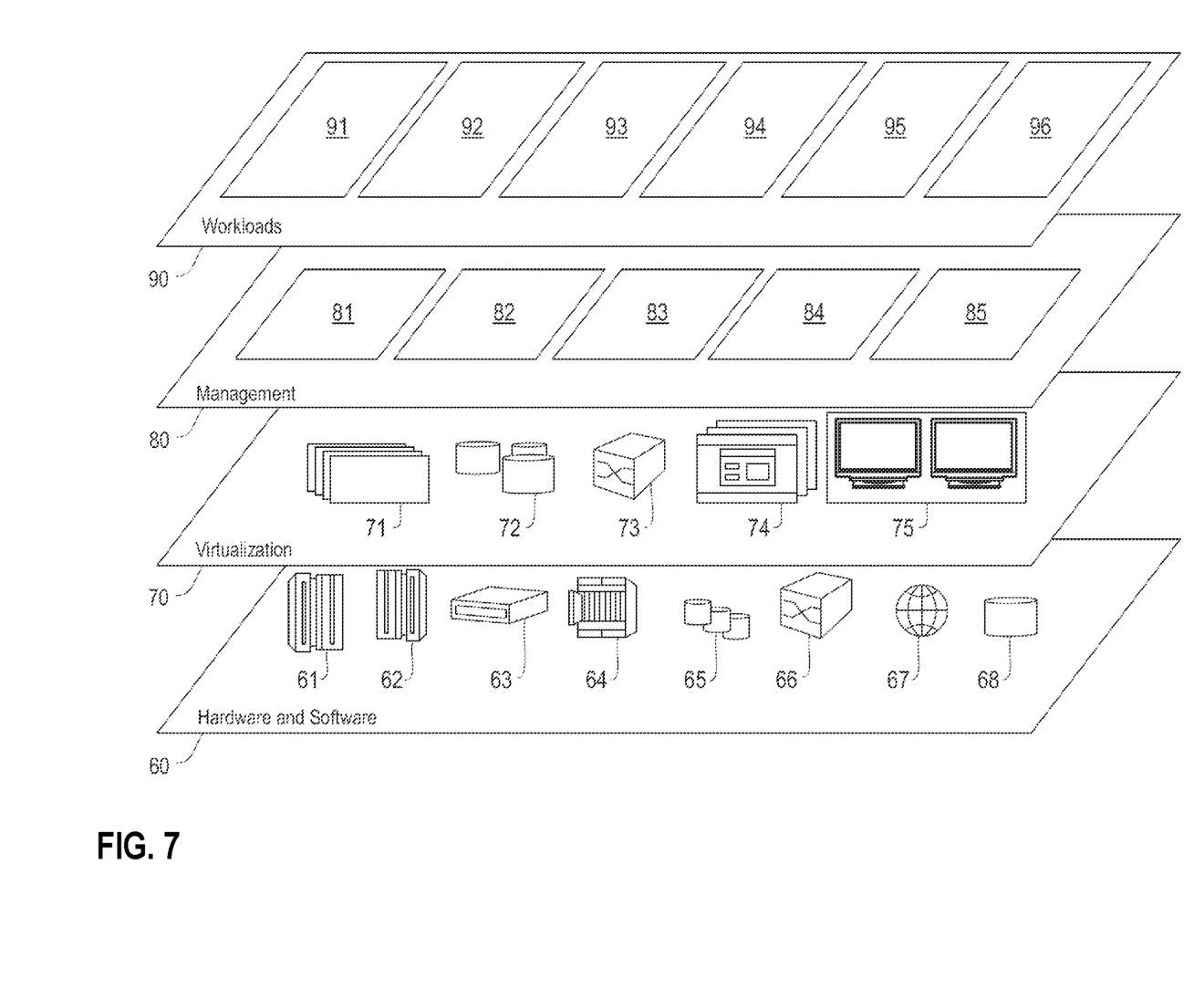
FIG. 7 depicts abstraction model layers in accordance with exemplary embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and classifying data from de-identified content 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, improvements to the efficiency and results of anonymization systems by implementing a pseudonymization classifier. Additionally, synthetic training data can be generated to improve machine learning models (such as, for example, models for entity resolution and link prediction).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

applying one or more rules to identify one or more structural elements of a document, wherein the one or more structural elements are indicative of at least one of an organization of text within the document and a visual presentation of text within the document;

determining, based at least in part on the one or more structural elements, one or more pairs of words within the document having a hypernym relationship;

extracting de-identified content within the document based on one or more de-identification techniques applied to the document;

applying a set of causal rules to the de-identified content and the one or more pairs of words by computing mutual dependence and/or mutual independence between the de-identified content and the one or more pairs of words;

annotating, based at least in part on the computed mutual dependence and/or mutual independence, at least a portion of the de-identified content as belonging to a class of protected content; and training a machine learning model on a set of training data to automatically identify at least a portion of the de-identification techniques in at least one other document, wherein the set of training data comprises the annotated portion of the de-identified content;

wherein the method is carried out by at least one computing device.

2. The computer-implemented method of claim 1, wherein determining the one or more pairs of words comprises determining one or more contexts in which a given one of the words is used within the document.

3. The computer-implemented method of claim 2, wherein the one or more contexts correspond to the one or more structural elements.

4. The computer-implemented method of claim 2, wherein the determining the one or more contexts comprises computing a set of context vectors for the given word, wherein the set of context vectors comprises:

a first vector indicating the contexts in which the given word is used as a relational hypernym;

a second vector indicating the contexts in which the given word is used as a relational hyponym; and a third vector indicating the contexts in which the given word is used as a general hypernym.

5. The computer-implemented method of claim 4, wherein computing the set of context vectors comprises at least one of:

determining a number of times the given word appears in the document;

determining a number of times the given word precedes each of the one or more structural elements; and determining a number of times the given word succeeds each of the one or more structural elements.

6. The computer-implemented method of claim 1, wherein the one or more structural elements relate to at least one of:

at least one of a type and a style of font;

a type of spacing;

a type of indention;

at least one of: a shape or a position of a shape within the document;
one or more symbols; and
one or more keywords.

7. The computer-implemented method of claim 1, wherein the de-identification techniques comprise at least one of: one or more anonymization techniques and one or more pseudonymization techniques.

8. The computer-implemented method of claim 7, wherein the machine learning model comprises a deep neural network, and wherein the annotated portion of the de-identified content comprises one or more labeled samples to identify at least a portion of the de-identification techniques.

9. The computer-implemented method of claim 1, wherein the set of causal rules comprises at least one of a CCU causality rule and a CCC causality rule.

10. The computer-implemented method of claim 1, wherein
the mutual independence and/or the mutual dependence between the de-identified content and the one or more pairs of words is computed by applying one or more thresholds.

11. The computer-implemented method of claim 1, wherein the class of protected content is defined by a regulatory document.

12. The computer-implemented method of claim 1, wherein software is provided as a service in a cloud environment.

13. A computer program product comprising:
a computer readable storage medium; program instructions embodied therewithstored in the computer readable storage medium, for causing a computing device to perform the following computer operations:
apply one or more rules to identify one or more structural elements of a document, wherein the one or more structural elements are indicative of at least one of an organization of text within the document and a visual presentation of text within the document;
determine, based at least in part on the one or more structural elements, one or more pairs of words within the document having a hypernym relationship;
extract de-identified content within the document based on one or more de-identification techniques applied to the document;
apply a set of causal rules to the de-identified content and the one or more pairs of words by computing mutual dependence and/or mutual independence between the de-identified content and the one or more pairs of words;
annotate, based at least in part on the computed mutual dependence and/or mutual independence, at least a portion of the de-identified content as belonging to a class of protected content; and
train a machine learning model on a set of training data to automatically identify at least a portion of the de-identification techniques in at least one other document, wherein the set of training data comprises the annotated portion of the de-identified content.

14. The computer program product of claim 13, wherein determining the one or more pairs of words comprises determining one or more contexts in which a given one of the words is used within the document.

15. The computer program product of claim 14, wherein the one or more contexts correspond to the one or more structural elements.

16. The computer program product of claim 14, wherein the determining the one or more contexts comprises computing a set of context vectors for the given word, wherein the set of context vectors comprises:
a first vector indicating the contexts in which the given word is used as a relational hypernym;
a second vector indicating the contexts in which the given word is used as a relational hyponym; and
a third vector indicating the contexts in which the given word is used as a general hypernym.

17. The computer program product of claim 13, wherein the de-identification techniques comprise at least one of: one or more anonymization techniques and one or more pseudonymization techniques.

18. The computer program product of claim 13, wherein the set of causal rules comprises at least one of a CCU causality rule and a CCC causality rule.

19. The computer program product of claim 13, wherein
the mutual independence and/or the mutual dependence between the de-identified content and the one or more pairs of words is computed by applying one or more thresholds.

20. A system comprising:
a memory configured to store program instructions;
a processor operatively coupled to the memory to execute the program instructions to:
apply one or more rules to identify one or more structural elements of a document, wherein the one or more structural elements are indicative of at least one of an organization of text within the document and a visual presentation of text within the document;
determine, based at least in part on the one or more structural elements, one or more pairs of words within the document having a hypernym relationship;
extract de-identified content within the document based on one or more de-identification techniques applied to the document;
apply a set of causal rules to the de-identified content and the one or more pairs of words by computing mutual dependence and/or mutual independence between the de-identified content and the one or more pairs of words;
annotate, based at least in part on the computed mutual dependence and/or mutual independence, at least a portion of the de-identified content as belonging to a class of protected content; and
train a machine learning model on a set of training data to automatically identify at least a portion of the de-identification techniques in at least one other document, wherein the set of training data comprises the annotated portion of the de-identified content.

* * * * *